(12) United States Patent
Summerfield et al.

(10) Patent No.: US 9,492,887 B2
(45) Date of Patent: Nov. 15, 2016

(54) TOUCH SCREEN INTERFACE FOR LASER PROCESSING

(75) Inventors: Leif Summerfield, Bozeman, MT (US); Bill Clem, Bozeman, MT (US); Jay Wilkins, Belgrade, MT (US); Tom Wernikowski, Bozeman, MT (US); Jay Bernasek, Belgrade, MT (US)

(73) Assignee: Electro Scientific Industries, Inc., Portland, OR (US)

( * ) Notice: Subject to any disclaimer, the term of this patent is extended or adjusted under 35 U.S.C. 154(b) by 331 days.

(21) Appl. No.: 12/752,800

(22) Filed: Apr. 1, 2010

(65) Prior Publication Data
US 2011/0242307 A1 Oct. 6, 2011

(51) Int. Cl.
*B23K 26/03* (2006.01)
*B23K 26/08* (2014.01)
*G02B 21/26* (2006.01)

(52) U.S. Cl.
CPC ......... *B23K 26/032* (2013.01); *B23K 26/0853* (2013.01); *G02B 21/26* (2013.01)

(58) Field of Classification Search
CPC ............. B23K 26/032; B23K 26/0853; G02B 21/26
USPC .......................................................... 348/79
See application file for complete search history.

(56) References Cited

U.S. PATENT DOCUMENTS

| | | |
|---|---|---|
| 5,859,700 A | 1/1999 | Yang |
| 6,040,139 A * | 3/2000 | Bova ............................ 435/6.16 |
| 6,111,251 A | 8/2000 | Hillenkamp |
| 6,965,356 B2 | 11/2005 | Vaccarelli |
| 6,991,374 B2 | 1/2006 | Salmon et al. |
| 7,388,599 B2 * | 6/2008 | Maddison et al. .............. 348/79 |
| 7,615,738 B2 * | 11/2009 | Kley ...................... B82Y 20/00 250/234 |
| 7,647,085 B2 | 1/2010 | Cane et al. |
| 8,144,189 B2 * | 3/2012 | Fujiwara ......................... 348/45 |
| 8,248,476 B2 * | 8/2012 | Ke et al. ....................... 348/187 |
| 9,081,028 B2 * | 7/2015 | Meyer |
| 2002/0025511 A1 | 2/2002 | Bova |
| 2003/0161515 A1 | 8/2003 | Salmon et al. |
| 2004/0063113 A1 | 4/2004 | Agnes et al. |
| 2004/0095575 A1 * | 5/2004 | Woo et al. .................... 356/300 |
| 2005/0017153 A1 | 1/2005 | Rentzsch |
| 2005/0256654 A1 | 11/2005 | Salmon et al. |
| 2005/0270639 A1 * | 12/2005 | Miki ............................ 359/381 |

(Continued)

FOREIGN PATENT DOCUMENTS

| | | |
|---|---|---|
| JP | 08-223563 A | 8/1996 |
| JP | 09-197287 A | 7/1997 |

(Continued)

OTHER PUBLICATIONS

International Preliminary Report of PCT/US2011/030761, 4 pages.

(Continued)

*Primary Examiner* — Anner Holder
(74) *Attorney, Agent, or Firm* — Haynes Beffel & Wolfeld LLP (57) ABSTRACT

A touch screen user interface for an optical device wherein the touch screen user interface is connected to a controller which controls motion stages permitting the motion stages to re-position, re-size, re-orient or focus the field of view of the optical device in response to commands input from the touch screen user interface.

16 Claims, 4 Drawing Sheets

(56) References Cited

U.S. PATENT DOCUMENTS

| | | | |
|---|---|---|---|
| 2005/0275837 A1* | 12/2005 | Zhang et al. | 356/301 |
| 2007/0091324 A1 | 4/2007 | Paul et al. | |
| 2008/0155452 A1* | 6/2008 | Mizusawa | 715/772 |
| 2009/0247997 A1* | 10/2009 | Watanabe et al. | 606/4 |
| 2009/0273782 A1* | 11/2009 | Yoo et al. | 356/318 |

FOREIGN PATENT DOCUMENTS

| | | |
|---|---|---|
| JP | 2001-059940 A | 3/2001 |
| JP | 2006-153762 A | 6/2006 |
| JP | 2007-196275 A | 8/2007 |
| JP | 2007-266007 A | 10/2007 |
| JP | 2008-114059 A | 5/2008 |
| JP | 2008-191134 A | 8/2008 |
| WO | WO 2007/143734 A2 | 12/2007 |
| WO | 2010/006067 A2 | 1/2010 |

OTHER PUBLICATIONS

Extended EP Search Report from corresponding EP Application No. 11763449.3; dated Oct. 18, 2013; 8 pgs.
Office Action in CN201180016525.9 dated Nov. 4, 2014, 11 pages. Non-Certfied English Translation.
Office Action, Notice of Reasons for Rejection, from corresponding JP Patent Application No. 2013-502854; Oct. 21, 2014; 5 pgs. (translation—6 pgs.).
European Office Action dated Oct. 13, 2015 in related Application No. 11 763 449.3-1702, 5 pages.

\* cited by examiner

TOUCH SCREEN INTERFACE FOR LASER PROCESSING

TECHNICAL FIELD

This invention is a touch screen user interface for imaging devices. In particular it is a touch screen interface for microscopy systems, wherein the microscope has motion stages for holding the specimen to be examined and where the touch screen user interface is connected to a controller which receives commands from the touch screen user interface and converts them into commands which drive the motion stages. In more particular it is a touch screen user interface for optical microscopy wherein the user can enter commands to the system via touch screen user interface and have the motion stages respond to those commands as if the user had moved the specimen directly rather than touching an image of the specimen on a touch screen.

BACKGROUND OF THE INVENTION

The field of optical microscopy is broad, encompassing many types of optical and other devices which rely upon magnification to image or examine or extract information regarding specimens that are smaller than are normally visible with the un-aided human eye. In particular we are concerned with computer-assisted microscopes, wherein a computer is attached to the microscope to provide a display of the image data being produced by the microscope and a user interface to control the various capabilities of the microscope. In addition to optical microscopes, such devices as electron microscopes or confocal microscopes also have computers for image acquisition, display, management and user interface functions. In more particular we are concerned with optical microscopes used in laser processing systems, where the microscope is used to align and plan the laser beam path with respect to the specimen and optionally inspect the results of laser processing. Exemplary laser processing systems that use optical microscopes in this fashion include laser ablation inductively coupled plasma mass spectroscopy (LA ICP-MS), laser ablation inductively coupled plasma emission spectroscopy (ICP-OES/ICP-AES) and matrix assisted laser desorption ionization time of flight (MALDI-TOF) spectroscopy.

A problem that computer assisted microscopy systems have in common is that the user needs to select the point on the specimen at which the laser impinges. This is to control the composition and quality of the sample of the specimen created by the laser. Often the specimen is sealed in a sample chamber with limited access. This means that the field of view must often be moved around relative to the specimen under examination using remote controls. Added to this is the 3-dimensional nature of some specimens and the limited depth of field of typical microscope systems at high magnifications which combine to require that the field of view be moved in three dimensions including possibly three degrees of rotation in order to image a specimen as desired. A problem is that the controls to change the field of view in this fashion may be divided between two or more motion elements and coordinating these motions to provide a desired transition of the relationship between field of view and specimen can be a difficult task. In any case, altering the relation between the laser beam and the specimen is a common task in these types of systems. Any improvement in user interface that decreased setup time and made positioning specimens easier and faster would be of positive benefit.

U.S. Pat. No. 5,859,700 HIGH RESOLUTION IMAGING MICROSCOPE (HIRIM) AND USES THEREOF, inventor Mary M. Yang, Jan. 12, 1999, describes a type of digital imaging microscope, specifically a digital imaging spectrophotometer and the computer interfaced to this microscope in detail. Described in particular is the ability of the computer to acquire large volumes of spectroscopic data and make it available for display. U.S. Pat. No. 6,991,374, COMPUTER CONTROLLED MICROSCOPE, inventors Nicholas James Salmon and Ernst Hans Karl Stelzer, Jun. 31, 2006, describes a computer controlled optical microscope that can remember the parameter settings from on set of image data and apply it to related image data sets as they are recorded by the system. U.S. Pat. No. 7,647,085, METHOD AND APPARATUS FOR INVESTIGATING TISSUE HISTOLOGY, inventors Michael Roger Cane, Michael Andrew Beadman and Symon D'Oyly Cotton, Jun. 12, 2010, describes a computer-assisted optical microscope with a touch screen interface, but the touch screen is only used to commence operational or programming steps.

Touch screen technology is well-known and widely commercially available. It involves adding equipment to a display to allow the user to input commands to the system by touching a display screen. Touch screen displays typically work either by detecting changes in capacitance caused by the user's touch or by detecting changes in infrared transmission across the screen. In response to a user's touch, the screen transmits the coordinates of the point on the screen touched to a controller. The controller typically interprets the coordinates of the screen touch as being from a pointing device such as a mouse or trackball and takes appropriate actions depending upon how it has been programmed.

What is needed then is a touch screen user interface for computer-assisted microscopy systems that is operatively connected to motion stages to permit the user to input commands to the motion stages to alter the field of view of the system and improve system setup, increase throughput and overcome the problems associated with achieving desired changes in the relationship between the specimen and the laser beam.

SUMMARY OF THE INVENTION

This invention is a touch screen interface integrated with an optical microscope in a laser processing system. Aspects of this invention include an optical system having a controller, a field of view and a specimen to be viewed, and includes a touch screen user interface operatively connected to the controller. Other aspects of this invention include motion stages operatively connected to the controller which hold the specimen and change the relationship between said specimen and said field of view. The controller is operative to input user commands from a touch screen user interface, transform the user commands into output commands and output the output commands to the motion stages. The motion stages, in response to said output commands, alter the relationship between said field of view and the specimen according to input user commands from a touch screen.

Figure 1:
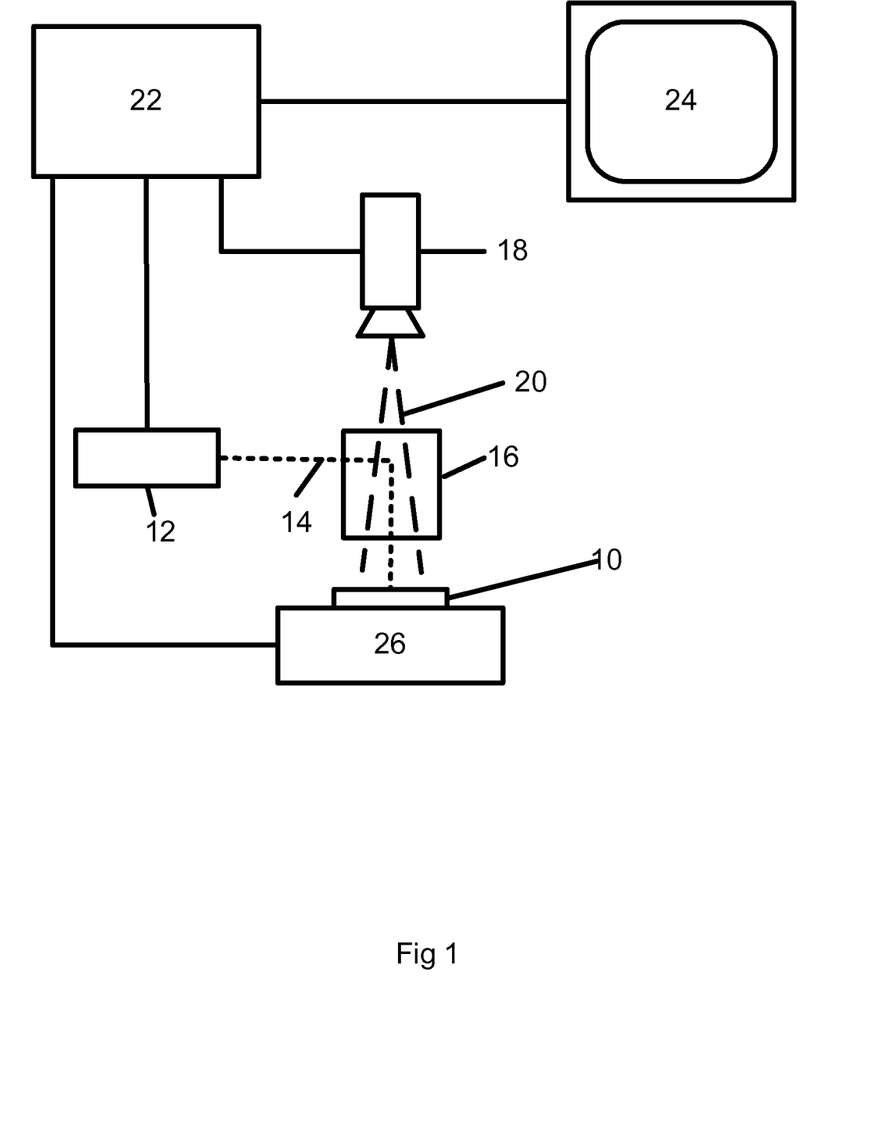
FIG. 1. Diagram of touch screen laser processing system
Figure 2A:
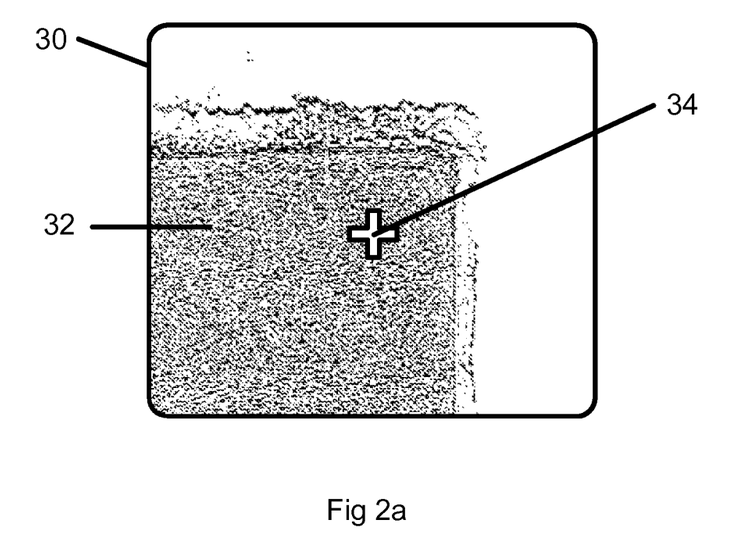
FIG. 2a. Diagram showing touch screen with image and graphics

Exemplary laser processing systems that could benefit from this invention include laser ablation inductively coupled plasma mass spectroscopy, laser ablation inductively coupled plasma emission spectroscopy and matrix assisted laser desorption ionization time of flight spectroscopy. A schematic diagram of an embodiment of this invention is shown in FIG. 1. These systems can all employ optical microscopes to view the specimen to be processed. In operation a specimen is placed in the system and the optical microscope is used to select a start position for the laser beam to impinge upon the specimen and begin processing. This is accomplished by acquiring images of a field of view of the specimen and displaying it on a touch screen monitor. This display is "live" and continuous, meaning that any changes in the field of view of the camera will be displayed on the touch screen monitor. An example of this touch screen display is shown in FIG. 2a. On the monitor, a graphic overlay indicates the position at which the laser beam will initially impinge upon the specimen. The monitor may also display a graphic overlay showing the tool path along which the laser beam will be subsequently directed to impinge the specimen. To alter the position at which the laser beam will impinge the specimen, the user touches the screen and drags a finger across the screen. The controller detects the motion of the user's finger on the screen and then directs the motion stages to move the specimen with respect to the field of view of the camera in order to make the image of the specimen on the touch screen appear as if the user had moved the image itself, rather than repositioning the sample in the field of view.

Figure 2B:
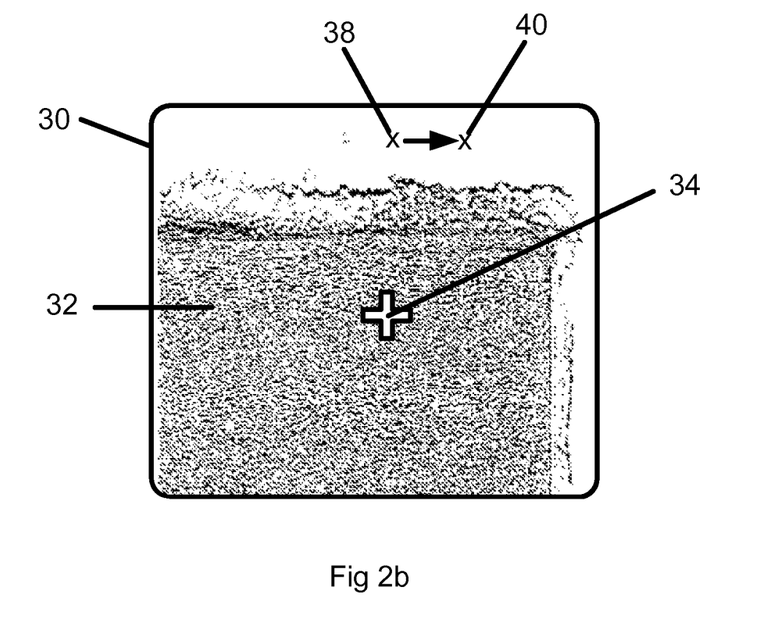
FIG. 2b. Diagram showing touch screen with image and graphics moved.

FIGS. 2a and 2b illustrate how the invention is used to select a new start point for laser processing. Assuming that the user desires to change the start point for laser processing in FIG. 2a, the user begins by touching the screen anywhere on the image of the specimen. When the user drags a finger on the screen, the touch screen interface detects the movement of the user's finger on the screen and directs the motion stages to physically move the specimen under the field of view of the optical microscope, thereby changing the image being viewed on the monitor. By appropriate programming of the controller, touching the screen and dragging a finger across the screen will make the image data on the screen appear as if it were being dragged by the finger. In actuality the controller is directing the motion stages to move the specimen in the field of view of the camera to simulate the motion that would occur if the user had moved the specimen by hand rather than dragging a finger across a touch screen. FIG. 2b shows the touch screen following user input showing the movement of the image data in relation to the onscreen graphic overlay showing the laser beam impact point.

The controller can be programmed to offer many different options for responding to user touch screen input. The controller can move the motion stages to cause the image data to move either more or less than the motion input from the screen. This would have the effect of either accelerating specimen motion or making it more sensitive to small motion for fine adjustments. The controller can also interpret some motions relating to Z-axis motion, where moving a finger up and down on the screen, for example, would move the specimen up and down in the field of view, potentially moving the specimen in and out of focus. Other motions can be programmed to move the specimen in 3D, if desired. Alternatively, the controller can be programmed to move the cursor or other screen graphics in response to user touch screen input. For example, in this mode, the user could move the point where the laser beam will impinge upon the specimen by touching the screen and moving the graphic device which indicates the location of the laser beam. The controller then directs the motion stages to move the specimen in relation to the laser beam in order to have it impinge at the selected position.

Adding a touch screen interface, controller and motion stages to an optical microscope equipped laser processing system allows the user to interact with a touch screen and have it appear as if they were directly manipulating a specimen. This is significant for two reasons. The first is that the specimen may be sealed in a specific environment for processing. Laser processing systems sometimes require the specimen to be sealed in an inert gas atmosphere, such as nitrogen or argon, to allow processing, making the specimen difficult to manipulate directly. In addition, in cases where complex motion stages are used to move the part, motion of two or more actuator/stage/encoder units may have to be coordinated to effect a desired change in position. Adding an appropriately programmed touch screen interface reduces all of these motions to a simple screen touch. Providing a laser processing system with the improvements described herein will make the system easier to operate and increase system throughput.

DETAILED DESCRIPTION OF THE PREFERRED EMBODIMENTS

This invention is a touch screen interface integrated with an optical microscope in a laser processing system. An embodiment of this invention is shown in FIG. 1. This embodiment includes a specimen 10, and a laser 12 having a laser beam 14. The laser beam 14 is directed to the specimen 10 by an optical microscope 16. This optical microscope 16 is an exemplary optical device which combines the optical axes of the laser 10 and the camera field of view 20 to permit the camera 18 to image the portion of specimen 10 that falls within the field of view 20. Other optical devices can also be used to combine the laser beam 14 and camera field of view 20, for example a half-silvered mirror (not shown). In addition, the system can be constructed so that the camera field of view 20 and the laser beam 14 are not on the same optical axis and therefore require separate optical devices (not shown) to direct the laser beam 14 and camera field of view 20. In this case the controller 22 calculates the actual offset between the camera field of view 20 and the laser beam 14 and applies this offset to subsequent calculations.

The camera 18 is connected to a controller 22 which directs the camera to acquire image data and transmit it to the controller 22. The controller 22 displays the image data from the camera 18 on the touch screen monitor 24. The camera 18 is typically a video type camera which is capable of acquiring image data continuously or at frame rates high enough to appear continuous. The controller 22 is also connected to motion stages 26 which move the specimen 10 in relation to the laser beam 14 and the camera field of view 20. Although this embodiment shows the specimen 10 being carried by the motion stages 26, the system could also move the laser beam 14 and the field of view 20 in relation to the specimen 10, or split the motion between these elements by attaching motion stages to each (not shown). Embodiments of this invention can alter the position of the specimen 10 with relation to the laser beam 14 and field of view 20 in up to three dimensions (X, Y and Z) and three rotations (rho, phi and theta) about three axes to permit the system to apply the laser beam 14 to any desired portion of the specimen 10.

In an embodiment of this invention the laser beam 14 is used to ablate material from the specimen 10 to permit examination of the ablated material. It is typically the case that the user desires to select a particular portion or portions of the specimen 10 to ablate for examination. For example, the specimen 10 may be composed of more than one type of material and the user desires to study only one of the materials. The user would use the image of the specimen 10 falling within the field of view 20 displayed on the touch screen 24 to position the laser beam 14 on the specimen 10 by touching the touch screen 24 and thereby directing the controller 22 to command the motion stages 26 to move the specimen 10 with respect to the laser beam 14 and field of view 20. This process is illustrated in FIGS. 2*a* and 2*b*. FIG. 2*a* shows an embodiment of this invention with a touch screen display 30 displaying an image of a specimen 32. On the touch screen display 30 overlaid on the image of the specimen 32 are overlay graphics indicating the point 34 at which the laser beam 14 will impinge upon the specimen when the laser is directed to emit a laser beam. FIG. 2*b* shows how the user can alter the point 34 at which the laser beam will impinge upon the specimen 10. In FIG. 2*b* the user touches the screen at 38 and drags the finger across the screen to 40 along the path indicated by the arrow. This causes the controller 22 to direct the motion stages 26 to move the specimen 10 within the field of view 20, causing the image of the specimen 32 to change on the touch screen display 30, thereby moving the point 34 at which the laser will impinge the specimen 10.

At this point the user typically directs the laser to emit a beam 14 and ablate material. Note that this motion can be programmed to either translate the motion of the user's finger on the screen 38, 40 into exactly matching the motion of the relation between the specimen 10 and the camera field of view 20, thereby allowing the user to alter the relationship between the specimen 10 and the camera field of view 20 and hence the location of the displayed image of the specimen 32 on the touch screen display 30 in a one-to-one correspondence to the motion of the user's finger on the screen 38, 40. In other embodiments, the system is programmed to either magnify or minify the user's input finger motion on the screen 38, 40. In these cases the relationship between the specimen 10 and the field of view 20 can be programmed to make the image of the specimen 32 on the touch screen display 30 move more or less than the user's input finger motion 38, 40, thereby either exaggerating the input motion to speed movement over a larger specimen area or reducing the input motion to improve precision.

Directing the motion stages 26 in response to user input from the touch screen 30 in this fashion requires that the controller 22 transform the input user commands such as generated by dragging a finger from point 38 to point 40 from screen coordinates to output commands for the motion stages. This may involve splitting the motion between multiple axes of the motion stages. For example, if the specimen 10 is held on a pair of X, Y stages, a diagonal movement input on the screen 30 would have to be transformed by the controller 22 into output commands to both the X and Y axes of the motion stages 26 to cause a diagonal movement of the specimen 10 that corresponds to the diagonal user command input on the touch screen 30. Another example would be if the specimen had three dimensional surface detail. In this case, movement of the field of view of the camera on the specimen may cause the optical microscope to go out of focus if the height of the specimen changes even slightly when moving to a new area to be imaged. Output commands would have to be generated by the controller 22 indicating that the system needs to refocus. Re-focusing could be accomplished by having motion stages move optical elements in the microscope 16, move the specimen 10 up or down or move the microscope 16 up or down or some combination of these motions (not shown).

Figure 3:
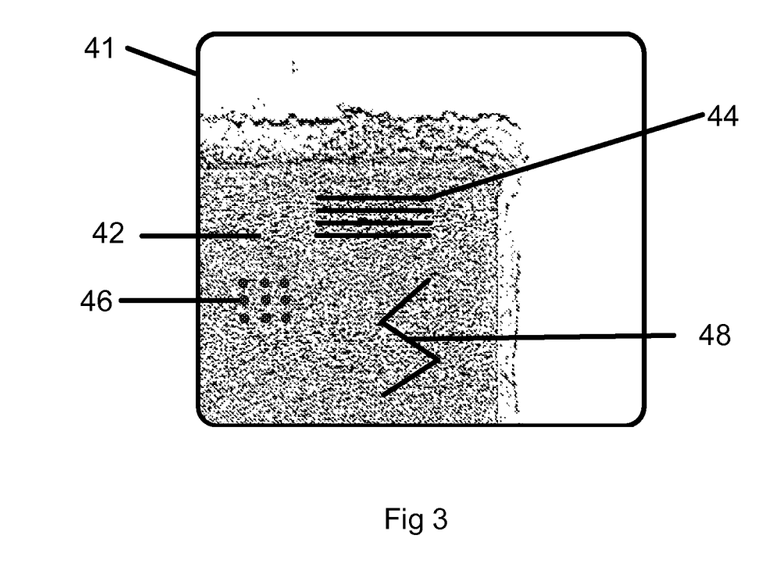
FIG. 3. Diagram showing touch screen with image and toolpaths.

FIG. 3 shows further embodiment of the instant invention, wherein a touch screen display 41, displays an image of a specimen 42. On the image of the specimen 42 exemplary tool paths 44, 46, 48 are shown which indicate multiple locations where the laser will be directed to ablate material from the specimen. Shown are a raster pattern 44, a collection of points 46 and an arbitrary path 48. These exemplary tool paths 44, 46, 48 are designed by the user and associated with the image of the specimen using graphics input software (not shown). The difference between these tool paths and the points indicated in FIGS. 2*a* and *b* is that these patterns are associated with locations on the specimen and when the user moves the image of the specimen 42 using this touch screen 42, the tool paths 44, 46, 48 move along with the image of the specimen, indicating that the laser will ablate materials from the same location on the specimen regardless of where the specimen is moved in the field of view.

Figure 4:
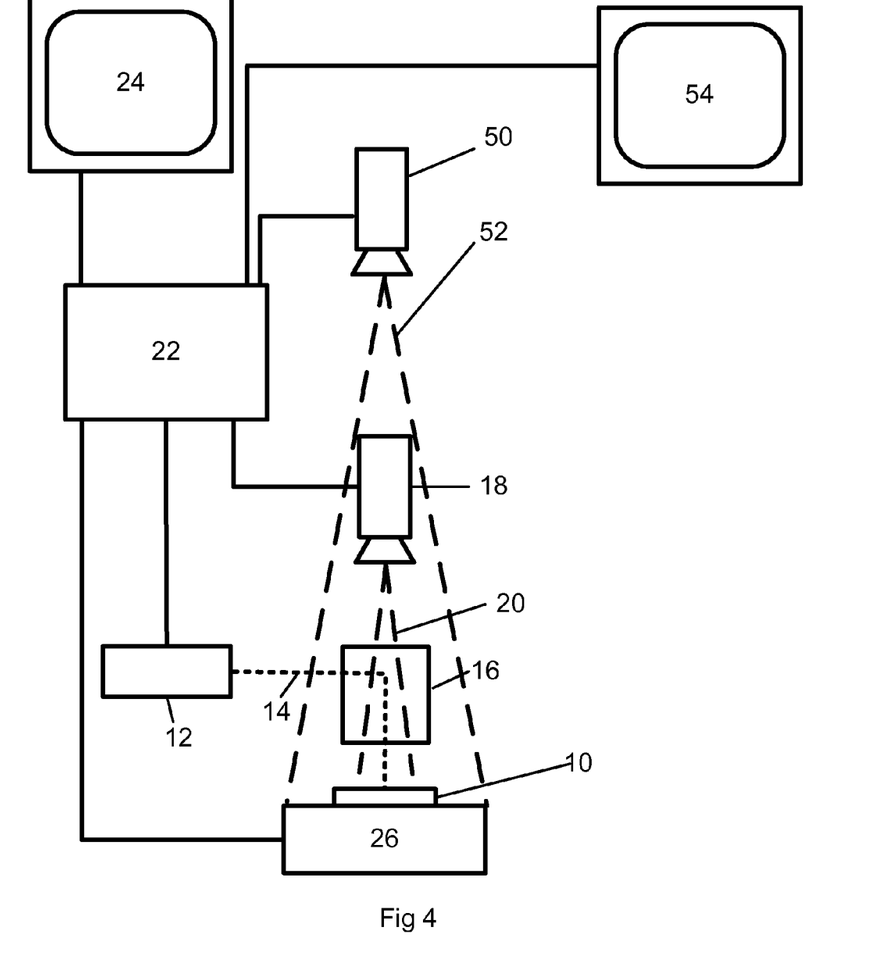
FIG. 4. Diagram of touch screen laser processing system with additional field of view camera.

Another embodiment of this invention is shown in FIG. 4. This embodiment has a second camera 50 with a large field of view 52 which is displayed on a second monitor having a touch screen 54. This touch screen monitor 54 is in communication with the controller 22 to input commands that are transformed and result in movement of the motion stage 26. The high resolution camera 18 continues to view a high resolution view of the specimen 10 through the microscope 16. In this embodiment, the large field of view camera 50 and touch screen monitor 54 can be used to move the specimen with relation to the laser processing system while the small field of view (high resolution) camera 18 and monitor 24 is used to view the specimen. In operation, the system may have one or two touch screen interfaces or combine the displays on one monitor.

Having hereby disclosed the subject matter of the present invention, it should be obvious that many modifications, substitutions, and variations of the present invention are possible in view of the teachings. It is therefore understood that the invention may be practiced other than as specifically described, and should be limited in its breadth and scope only by the following claims.

We claim:

1. A laser processing system configured to process a specimen, comprising:
   a controller;
   a first camera having a first field of view operatively connected to said controller;
   a touch screen user interface operative to input user commands and operatively connected to said controller to display images from said first camera, the user input commands comprising touching the touch screen user interface; and
   motion stages configured to hold said specimen within the first field of view and operatively connected to said controller;
   said controller being operative to accept said input user commands from said touch screen user interface, transform said user commands into output commands and communicate said output commands to said motion stages; and wherein said motion stages, in response to said output commands, are operative to move said specimen relative to said first field of view according to said input user commands;

wherein the controller is operative to detect the motion of the user input commands on the touch screen user interface and then to direct the motion stages to move the specimen with respect to the field of view of the camera, thereby changing the image being displayed on the touch screen user interface as if the user were directly manipulating the specimen rather than repositioning the specimen in the field of view.

2. The laser processing system of claim 1 wherein said laser processing system is one of laser ablation inductively coupled plasma mass spectroscopy, laser ablation inductively coupled plasma emission spectroscopy, or matrix assisted laser desorption ionization time of flight spectroscopy.

3. The laser processing system of claim 1 wherein said first camera is operative to image said specimen using an optical microscope.

4. The laser processing system of claim 1 wherein said system has a second camera operatively connected to said controller for imaging a second field of view which is smaller than the first field of view, the second camera being usable to view the specimen while the first camera being usable to move the specimen.

5. A method for controlling a laser processing system for processing a specimen comprising:
providing a controller having input and output commands;
providing a first camera having a first field of view operatively connected to said controller;
providing a touch screen user interface operative to input user commands and operatively connected to said controller;
providing motion stages configured to hold said specimen within said first field of view and operatively connected to said controller;
inputting user commands from said touch screen user interface and communicating said input user commands to said controller as said input commands, the user input commands comprise touching the touch screen user interface;
transforming said input commands with said controller into said output commands and communicating said output commands to said motion stages; and
wherein said mod on stages, in response to said output commands, alter the relationship between said first field of view and the specimen according to said input user commands and thereby control said laser processing system;
wherein the transforming comprises:
detecting, the motion of the user touch input commands on the touch screen user interface; and then
directing the mod on stages to move the specimen with respect to the field of view of the camera, thereby changing the image being viewed on the touch screen user interface as if field of view.

6. The method of claim 5 wherein said laser processing system is one of laser ablation inductively coupled plasma mass spectroscopy, laser ablation inductively coupled plasma emission spectroscopy, or matrix assisted laser desorption ionization time of flight spectroscopy.

7. The method of claim 5 wherein said first camera images said specimen using an optical microscope.

8. The method of claim 5 further comprising operably connecting a second camera to said controller for imaging a second field of view which smaller than said first field of view.

9. The laser processing system of claim 1 wherein the controller is operative so that the image of the specimen is movable more than the motion input resulting from the touching of the touchscreen user interface.

10. The laser processing system of claim 1 wherein the controller is operative so that the image of the specimen is movable equal to the motion input resulting from the touching of the touchscreen user interface.

11. The laser processing system of claim 1 wherein the controller is operative so that the image of the specimen is movable less than the motion input resulting from the touching of the touchscreen user interface.

12. The method of claim 5 wherein the transforming comprises:
moving the image of the specimen more than the motion input resulting from the touching of the touchscreen user interface.

13. The method of claim 5 wherein the transforming comprises:
moving the image of the specimen equal to the motion input resulting from the touching of the touchscreen user interface.

14. The method of claim 5 wherein the transforming comprises:
moving the image of the specimen less than the motion input resulting from the touching of the touchscreen user interface.

15. A laser processing system configured to process a specimen, comprising:
a controller;
a first camera having a first field of view operatively connected to said controller;
a touch screen user interface operative to input user commands and operatively connected to said controller to display images from said first camera, the user input commands comprising touching the touch screen user interface; and
motion stages configured to hold said specimen within the first field of view and operatively connected to said controller;
said controller being operative to accept said input user commands from said touch screen user interface, transform said user commands into output commands and communicate said output commands to said motion stages;
a second camera operatively connected to said controller for imaging a second field of view which is smaller than the first field of view, the second camera being usable to view the specimen while the first camera being usable to move the specimen;
wherein said motion stages, in response to said output commands, are operative to move said specimen relative to said first field of view according to said input user commands; and
wherein the controller is operative to detect the motion of the user input commands on the touch screen user interface and then to direct the motion stages to move the specimen with respect to the field of view of the camera, thereby changing the image being displayed on the touch screen user interface.

16. A method for controlling a laser processing system for processing a specimen comprising:

providing a controller having input and output commands;
providing a first camera having a first field of view operatively connected to said controller;
providing a touch screen user interface operative to input user commands and operatively connected to said controller;
providing motion stages configured to hold said specimen within said first field of view and operatively connected to said controller;
inputting user commands from said touch screen user interface and communicating said input user commands to said controller as said input commands, the user input commands comprise touching the touch screen user interface;
transforming said input commands with said controller into said output commands and communicating said output commands to said motion stages; and
operably connecting a second camera to said controller for imaging a second field of view which is smaller than said first field of view;
using the second camera to view the specimen;
using the first camera to move the specimen;
wherein said motion stages, in response to said output commands, alter the relationship between said first field of view and the specimen according to said input user commands and thereby control said laser processing system;
wherein the transforming comprises:
detecting the motion of the user touch input commands on the touch screen user interface; and then
directing the motion stages to move the specimen with respect to the field of view of the camera, thereby changing the image being viewed on the touch screen user interface.

* * * * *